(12) United States Patent
Vazquez

(10) Patent No.: US 12,721,319 B2
(45) Date of Patent: Sep. 1, 2026

(54) LEASH WITH INTERCHANGEABLE HANDLE

(71) Applicant: Mario Alan Vazquez, Henderson, NV (US)

(72) Inventor: Mario Alan Vazquez, Henderson, NV (US)

( * ) Notice: Subject to any disclaimer, the term of this patent is extended or adjusted under 35 U.S.C. 154(b) by 0 days.

(21) Appl. No.: 19/369,214

(22) Filed: Oct. 25, 2025

(65) Prior Publication Data

US 2026/0157344 A1 Jun. 11, 2026

Related U.S. Application Data

(63) Continuation-in-part of application No. 29/997,864, filed on Apr. 10, 2025, now Pat. No. Des. 1,104,373, and a continuation-in-part of application No. 18/412,821, filed on Jan. 15, 2024, now abandoned.

(51) Int. Cl.

| | |
|---|---|
| ***A63B 23/16*** | (2006.01) |
| ***A01K 27/00*** | (2006.01) |
| ***A63B 21/00*** | (2006.01) |
| ***A63B 21/02*** | (2006.01) |

(52) U.S. Cl.
CPC ...... *A01K 27/004* (2013.01); *A63B 21/00061* (2013.01); *A63B 21/023* (2013.01); *A63B 23/16* (2013.01)

(58) Field of Classification Search
CPC ...... A01K 27/004; A63B 21/023; A63B 23/16
See application file for complete search history.

(56) References Cited

U.S. PATENT DOCUMENTS

| | | | | |
|---|---|---|---|---|
| 3,215,429 A * | 11/1965 | Shaboo | A63B 21/4007 | 482/125 |
| 4,501,230 A * | 2/1985 | Talo | A01K 27/004 | 119/796 |
| 4,748,937 A * | 6/1988 | Musetti | A01K 27/004 | 119/796 |
| 6,619,239 B1 * | 9/2003 | Benson | A63B 21/0601 | 119/796 |

* cited by examiner

*Primary Examiner* — Kimberly S Berona
*Assistant Examiner* — Steven J Shur
(74) *Attorney, Agent, or Firm* — Sam Pierce

(57) ABSTRACT

According to an aspect of the present invention, there is provided a retractable animal leash with a grip strengthening exercise feature, comprising: a leash housing a leash; a brake for the leash; a first hand grip, wherein the first hand grip is a standard hand grip; an interchange member, wherein the interchange member is configured to lock and unlock the first hand grip; and a second hand grip interchangeable with the first hand grip, wherein the second hand grip has a grip strengthening feature configured to be squeezed against the resistance of a spring.

7 Claims, 2 Drawing Sheets

LEASH WITH INTERCHANGEABLE HANDLE

BACKGROUND

A popular type of leash among pet owners is a retractable leash. A retractable leash can allow the pet owner to vary the distance that the pet can be from the owner at any given time. In particular, the owner can allow the pet to wander farther away when it is safe to do so and keep the pet closer when it would be unsafe for the pet to wander. Retractable leashes often let out leash unless a brake is applied have been described in the prior art patent literature.

For example, U.S. Pat. No. 8,516,979 discloses a retractable leash for restraining an animal attached to the retractable leash. The retractable leash includes a housing and a spool in the housing. The retractable leash also includes a leash, where the leash is wound around the spool and at least a portion of the leash can extend from the housing. The retractable leash further includes a cam, where the cam is configured to be forced outward against the housing when the spool rotates at a high rate.

Grip strengthening hand exercising devices that may be used to strengthen the muscles of a user involved in a hand grip, such as muscles in the hand, wrist, or forearm, have also been described in the prior art patent literature.

For example, U.S. Pat. No. 10,981,027 discloses a hand exercising device with selectively adjustable strength includes a first and second handle pivotably coupled with a spring biased between them, the spring pivotably coupled to the first handle, and a spring positioner coupled to an end of the spring configured to be selectively positioned among a plurality of grooves within the second handle.

However, the prior art does not disclose a leash handle which is interchangeable between a standard handle and a handle with a grip strengthening hand exercise device integrated as part of an animal leash, and it would be convenient to have this feature integrated for some pet owners interested in strengthening muscles in the hand, wrist, or forearm involved in making a hand grip.

SUMMARY OF INVENTION

Therefore, the present invention provides an animal leash with handle which is interchangeable between a standard handle and a handle with a grip strengthening hand exercise device. The animal leash is provided with a retractable leash for attaching to an animal and features a pair of handles which can be squeezed together.

According to an aspect of the present invention, there is provided a retractable animal leash with a grip strengthening exercise feature, comprising: a leash housing a leash; a brake for the leash; a first hand grip, wherein the first hand grip is a standard hand grip; an interchange member, wherein the interchange member is configured to lock and unlock the first hand grip; and a second hand grip interchangeable with the first hand grip, wherein the second hand grip has a grip strengthening feature configured to be squeezed against the resistance of a spring.

DETAILED DESCRIPTION

In each of FIGS. 1A, 1B, and 1C, and FIGS. 2A and 2B, first push button connection 25 and second push button connection 27 are means for interchanging between a standard handle for an animal leash and a handle with a grip strengthening feature. The buttons can be depressed to remove the current handle and replace the current handle with the other handle. The standard handle uses only one push button connection, the first push button connection 25.

Figure 1A:
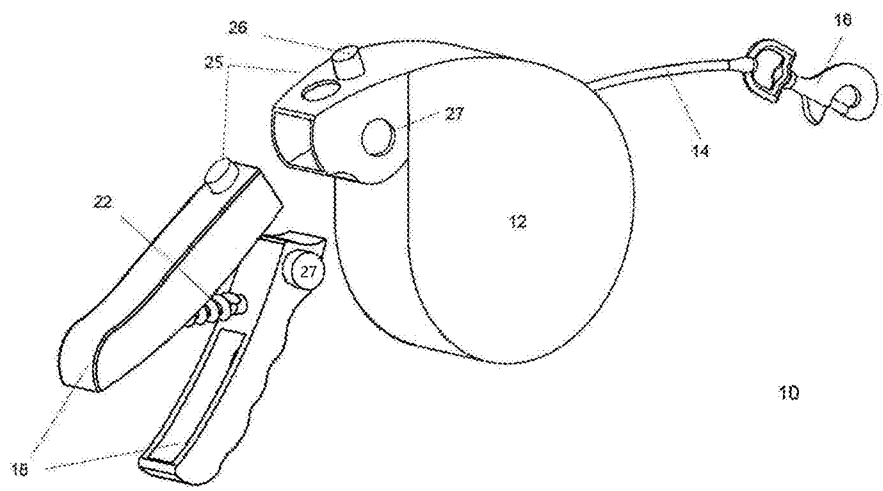
FIGS. 1A, 1B, and 1C illustrate a leash interchanged from the standard handle to the handle with the grip strengthening feature.
Figure 1B:
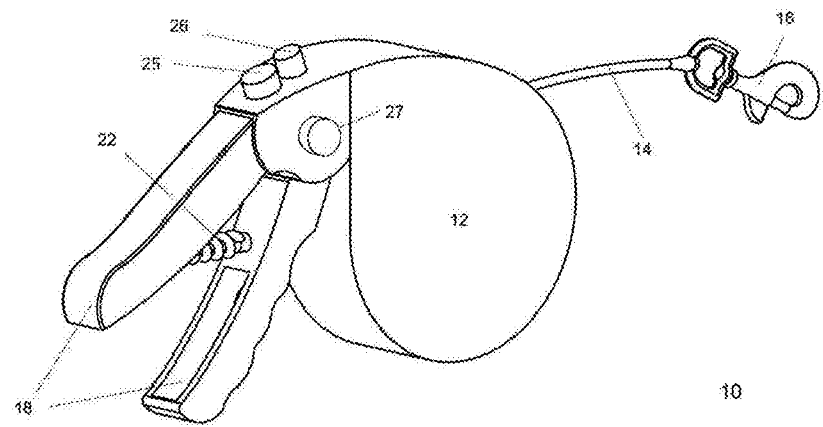
Figure 1C:
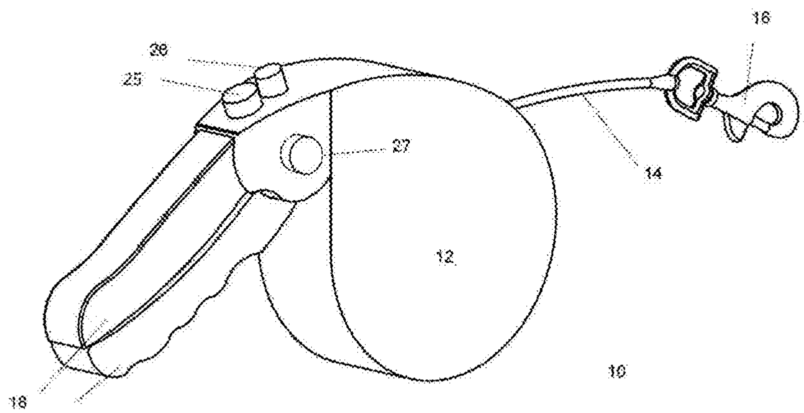

FIGS. 1A, 1B, and 1C illustrates a leash interchanged from the standard handle to the handle with the grip strengthening feature.

Housing 12 contains the leash which could be a variety of different sizes depending on the length of the leash, for example, 15 or 30 feet long, as well as the thickness of the leash material.

Retractable leash 14 is configured to wind around a spool contained within housing 12.

Handle 17 is a standard handle for a leash. Handle 17 can be detached for interchange by activating the push button connection Collar attachment 16 is configured to attach retractable leash 14 to the collar of the animal.

Brake lock for leash 26 keeps the brake limiting the unspooling at the same leash length. The brake lock 26 allows the holder to limit the unspooling of the leash so as to keep an animal attached to the leash from proceeding further from the holder.

Animal leash 10 includes a hand grip strengthener designed to improve the strength and endurance of the muscles in the hands and forearms. Typically, it consists of two handles that are connected by a spring or other type of resistance mechanism.

Animal leash 10 now includes a hand grip strengthener designed to improve the strength and endurance of the muscles in the hands and forearms, this time with the grip strengthener squeezed together.

First and second grips 18 are configured to squeeze together if force is applied, thereby exercising the hand grip muscles of the holder of the retractable leash.

Spring 22 provides the resistance for first and second grips 18 squeezing together. The stiffness of spring 22 can be set to different levels so that the force needed to squeeze first and second grips 18 together can be varied and sold as separate products or even in some embodiments using the same retractable leash with grip strengthening feature.

Housing 12 containing the leash, retractable leash 14 is configured to wind around a spool contained within housing 12, collar attachment 16 is configured to attach retractable leash 14 to the collar of the animal, and brake lock for leash 26 keeps the brake limiting the unspooling at the same leash length are unchanged from FIG. 1A.

First and second grips 18 are shown in FIG. 1B with force applied, thereby exercising the hand grip muscles of the holder of the retractable leash applying the force.

The spring is obscured from view while providing the resistance for first and second grips 18 squeezing together. The spring is coiled by the grip strength exercise of the leash holder.

Figure 2A:
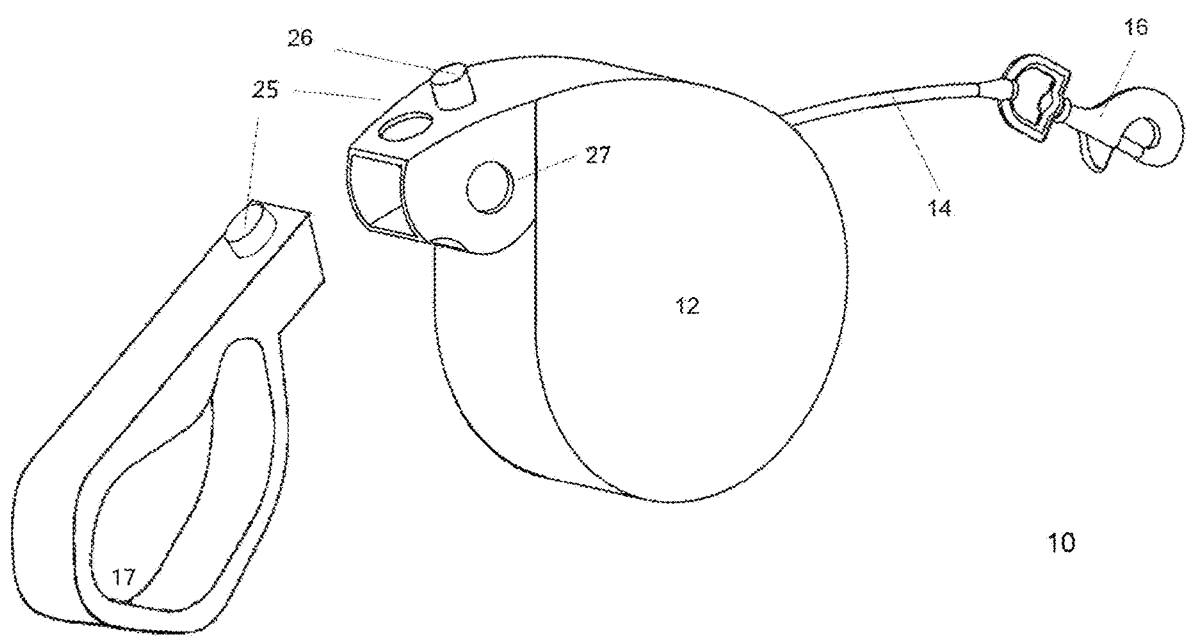
FIGS. 2A and 2B illustrate a leash with a standard handle.
Figure 2B:
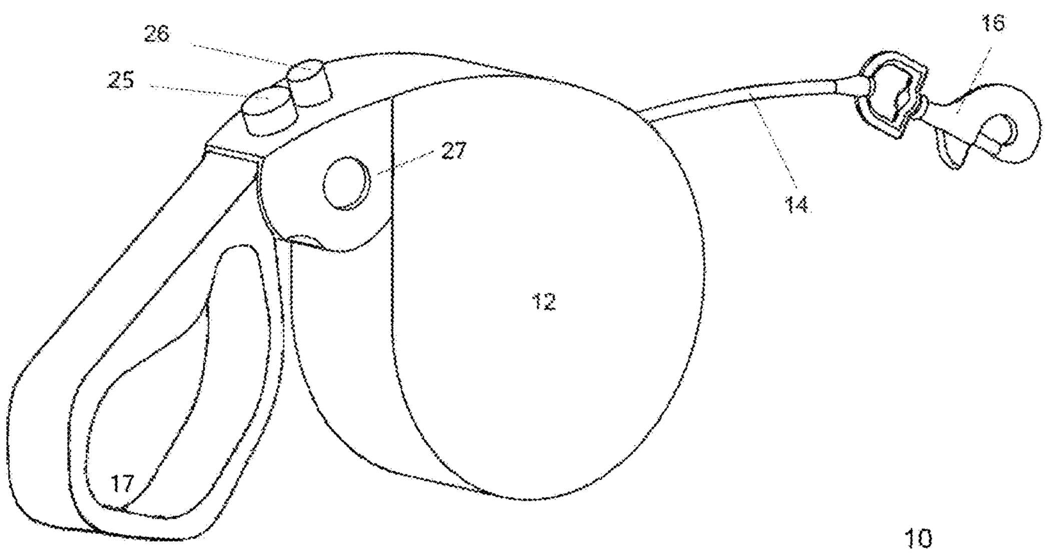

FIGS. 2A and 2B illustrate a leash with a standard handle.

Housing 12 contains the leash which could be a variety of different sizes depending on the length of the leash, for example, 15 or 30 feet long, as well as the thickness of the leash material.

Retractable leash 14 is configured to wind around a spool contained within housing 12.

Collar attachment 16 is configured to attach retractable leash 14 to the collar of the animal.

Brake lock for leash 26 keeps the brake limiting the unspooling at the same leash length.

The illustrations of embodiments described herein are intended to provide a general understanding of the structure of various embodiments, and they are not intended to serve as a complete description of all the elements and features of apparatus and systems that might make use of the structures described herein. Many other embodiments will be apparent to those of skill in the art upon reviewing the above description. Other embodiments may be utilized and derived therefrom, such that structural and logical substitutions and changes may be made without departing from the scope of this disclosure. Figures are also merely representational and may not be drawn to scale. Certain proportions thereof may be exaggerated, while others may be minimized. Accordingly, the specification and drawings are to be regarded in an illustrative rather than a restrictive sense. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description. Therefore, it is intended that the disclosure not be limited to the particular embodiment(s) disclosed.

What is claimed is:

1. A retractable animal leash with a grip strengthening exercise feature, comprising:

a leash housing a leash;

a brake for the leash;

a first hand grip, wherein the first hand grip is a standard hand grip;

an interchange member, wherein the interchange member is configured to lock and unlock the first hand grip; and a second hand grip interchangeable with the first hand grip, wherein the second hand grip has a grip strengthening feature configured to be squeezed against the resistance of a spring.

2. The retractable animal leash with a grip strengthening exercise feature of claim 1, further comprising a brake lock.

3. The retractable animal leash with a grip strengthening exercise feature of claim 1, wherein spring is stainless steel.

4. The retractable animal leash with a grip strengthening exercise feature of claim 1, wherein the leash housing is elliptical.

5. The retractable animal leash with a grip strengthening exercise feature of claim 1, wherein the first hand grip and second hand grip are positioned on the opposite side of the leash housing from the leash.

6. The retractable animal leash with a grip strengthening exercise feature of claim 1, wherein the first hand grip and second hand grip are separated by an acute angle in an initial unsqueezed position.

7. The retractable animal leash with a grip strengthening exercise feature of claim 1, further comprising an end of the leash configured for attaching to an animal.

* * * * *